US009383741B2

(12) United States Patent
Nakamura et al.

(10) Patent No.: US 9,383,741 B2
(45) Date of Patent: Jul. 5, 2016

(54) MOBILE ROBOT, POSITIONING SYSTEM OF MOBILE ROBOT, AND POSITIONING METHOD OF MOBILE ROBOT

(71) Applicant: KABUSHIKI KAISHA YASKAWA DENKI, Kitakyushu-shi (JP)

(72) Inventors: Tamio Nakamura, Kitakyushu (JP); Dai Kouno, Kitakyushu (JP); Takashi Nishimura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 46 days.

(21) Appl. No.: 14/135,811

(22) Filed: Dec. 20, 2013

(65) Prior Publication Data

US 2014/0316564 A1 Oct. 23, 2014

(30) Foreign Application Priority Data

Apr. 18, 2013 (JP) ................................. 2013-087196

(51) Int. Cl.
*G06F 19/00* (2011.01)
*G05B 19/19* (2006.01)
*B25J 5/00* (2006.01)
*B25J 9/00* (2006.01)

(52) U.S. Cl.
CPC .............. *G05B 19/19* (2013.01); *B25J 5/007* (2013.01); *B25J 9/0087* (2013.01); *G05B 2219/39013* (2013.01); *Y10S 901/01* (2013.01)

(58) Field of Classification Search
USPC .......... 700/245, 259, 264; 318/568.11, 568.1; 901/47, 9, 27, 28, 29, 14, 15, 16, 1, 8, 901/30, 31
See application file for complete search history.

(56) References Cited

U.S. PATENT DOCUMENTS

| | | | | | |
|---|---|---|---|---|---|
| 5,155,423 | A | * | 10/1992 | Karlen et al. | 318/568.11 |
| 5,572,103 | A | * | 11/1996 | Terada | B25J 9/1656 318/568.11 |
| 6,135,854 | A | * | 10/2000 | Masumura | B24B 37/08 451/291 |
| 7,183,563 | B2 | * | 2/2007 | Avnery | A61L 2/0011 250/492.3 |
| 7,952,728 | B2 | * | 5/2011 | Ibach | B25J 9/1962 356/614 |
| 8,800,695 | B2 | * | 8/2014 | Couture et al. | 180/7.1 |

(Continued)

FOREIGN PATENT DOCUMENTS

EP 2319664 A1 * 5/2011 ................. B25J 9/04
JP 63-16986 1/1988

(Continued)

OTHER PUBLICATIONS

Japanese Office Action for corresponding JP Application No. 2013-087196, Sep. 2, 2014.

*Primary Examiner* — Ronnie Mancho
(74) *Attorney, Agent, or Firm* — Mori & Ward, LLP

(57) ABSTRACT

A mobile robot has a seating part, a moving apparatus to move the seating part, and a robot part with a base part to be attached to the seating part, a body capable of rotating around a vertical axis normal to an attaching surface which the seating part to be attached to the base part, and an arm connected to the body having a plurality of joints. The seating part has a first surface facing a work that is subject to the operation by the robot part and a second surface that is different from the first surface, and the arms are formed such that the positional relationship between the arms and the first surface is substantially identical to the positional relationship between the arms and the second surface according to the rotation of the body around the vertical axis.

12 Claims, 12 Drawing Sheets

(56) References Cited

U.S. PATENT DOCUMENTS

| | | | | |
|---|---|---|---|---|
| 2001/0041129 | A1* | 11/2001 | Tsuneda | B25J 9/042 414/744.1 |
| 2003/0208302 | A1* | 11/2003 | Lemelson et al. | 700/245 |
| 2005/0107920 | A1* | 5/2005 | Ban | B25J 9/1692 700/245 |
| 2006/0111811 | A1* | 5/2006 | Okamoto et al. | 700/214 |
| 2010/0152899 | A1* | 6/2010 | Chang et al. | 700/262 |
| 2012/0072021 | A1* | 3/2012 | Walser | B25J 9/1697 700/254 |
| 2013/0274921 | A1* | 10/2013 | Aiso | G05D 3/00 700/251 |
| 2013/0325181 | A1* | 12/2013 | Moore | 700/259 |
| 2013/0325182 | A1* | 12/2013 | Setrakian et al. | 700/264 |
| 2013/0331989 | A1* | 12/2013 | Umeno | B25J 9/0096 700/258 |
| 2014/0039675 | A1* | 2/2014 | Ead | 700/245 |
| 2014/0163736 | A1* | 6/2014 | Azizian et al. | 700/259 |
| 2015/0119638 | A1* | 4/2015 | Yu et al. | 600/102 |

FOREIGN PATENT DOCUMENTS

| | | |
|---|---|---|
| JP | 05-080842 | 4/1993 |
| JP | 11-156764 | 6/1999 |
| JP | 2001-341085 | 12/2001 |
| JP | 2007-118176 | 5/2007 |

* cited by examiner

MOBILE ROBOT, POSITIONING SYSTEM OF MOBILE ROBOT, AND POSITIONING METHOD OF MOBILE ROBOT

CROSS-REFERENCE TO RELATED APPLICATIONS

The present application claims priority under 35 U.S.C. §119 to Japanese Patent Application No. 2013-087196, filed Apr. 18, 2013. The contents of this application are incorporated herein by reference in their entirety.

FIELD OF THE INVENTION

The present invention relates to a mobile robot, a positioning system of the mobile robot, and a positioning method of the mobile robot.

BACKGROUND ART

Japanese Unexamined Patent Application Publication No. 11-156764 discloses a technology of photographing a plurality of reference points by means of a photographing means for the purpose of correcting the operation positions of robots at stopping points along the way towards the destination.

SUMMARY OF THE INVENTION

The mobile robot has a seating part, a moving apparatus configured to move the seating part, a robot part with a base part to be attached to the seating part, a body capable of rotating around a vertical axis normal to an attaching surface to which the seating part and the base part are attached, and arms connected to the body having a plurality of joints. The seating part has a first surface facing the work that is subject to the operation by the robot part and a second surface that is different from the first surface. The arms are formed such that the positional relationship between the arms and the first surface is substantially identical to the positional relationship between the arms and the second surface according to the rotation of the body around the vertical axis.

Here, the vertical axis is normal to the work floor and is not always vertical to horizontal plane when the work floor has an inclined area.

A positioning system of the mobile robot includes the abovementioned mobile robot and a plurality of benchmark indexes to position arranged on a fixed base in order to be detected by a detecting part of the mobile robot.

A positioning method of the mobile robot includes the steps of detecting one benchmark index to position among a plurality of benchmark indexes to position by one detecting part among a plurality of detecting parts of the mobile robot, detecting other benchmark indexes different from the one benchmark index by other detecting parts different from the one detecting part, and detecting further benchmark indexes further different from the benchmark index and the other benchmark indexes by a detecting part different from other detecting parts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
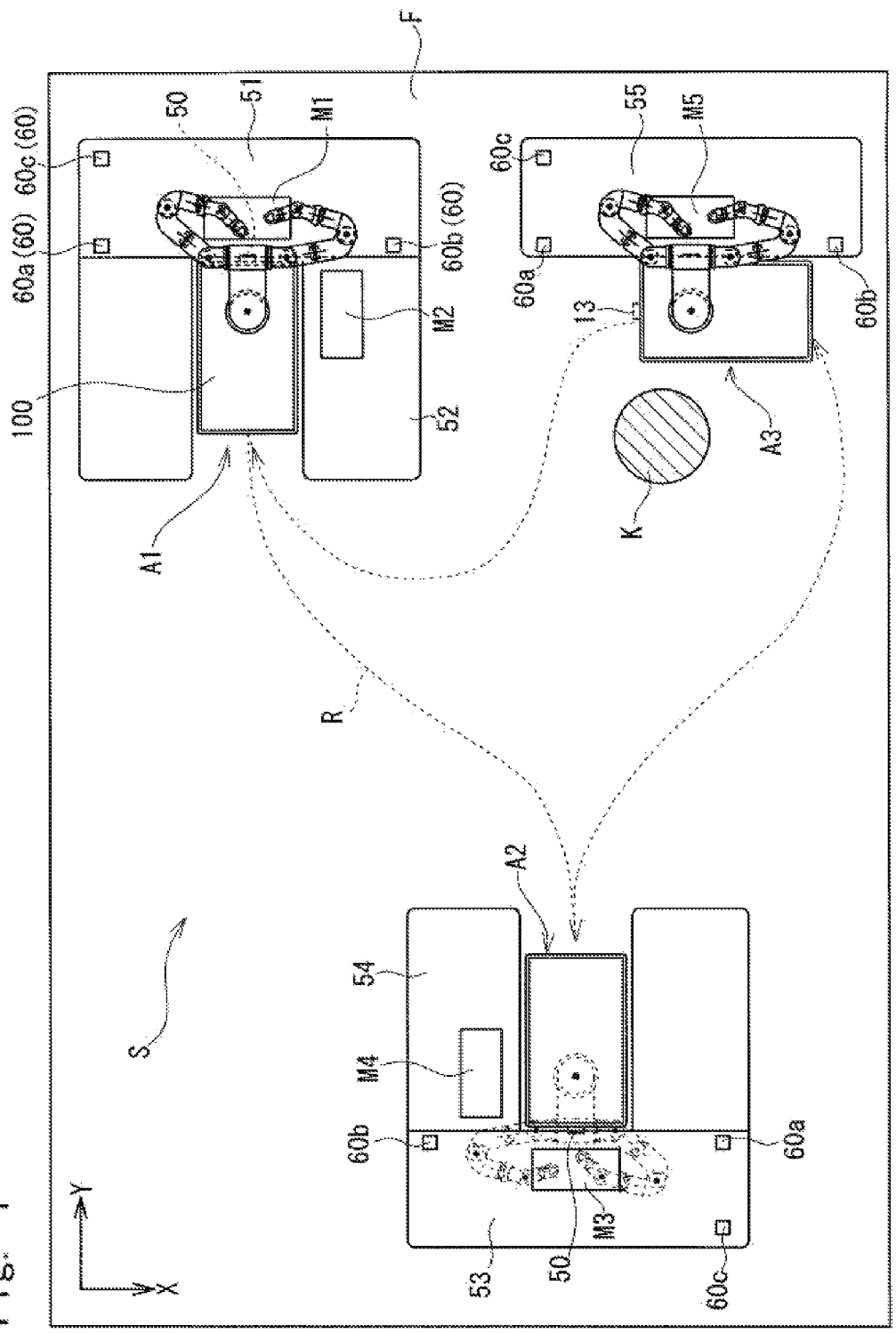
FIG. 1 shows the overall view of positioning system S of a mobile robot according to the embodiment(s).

Hereinafter, the positioning system of the mobile robot according to the embodiment(s) will be described. FIG. 1 shows the overall view of positioning system S (hereinafter, simply referred to as a positioning system) of a mobile robot according to the embodiment(s). FIG. 1 provides a planar view of overall work floor F. Positioning system S includes mobile robot 100 and standard marks (benchmark indexes) 60.

Mobile robot 100 serves to carry out the operation at the work position by being moved to the work position. According to the present embodiment, for example, mobile robot 100 moves from work position A1 to work position A2 or from work position A2 to work position A3 or work position A3 to work position A1. Obviously, mobile robot 100 may freely move between the work positions through other routes. Obstacle K is also mounted on work floor F. For example, obstacle K is a shelf for components, a pillar of a building, etc., with which mobile robot 100 must avoid contact upon moving. Standard marks 60 are positioning standards to position mobile robot 100 at the work position. Hereinafter, mobile robot 100 and standard marks 60 will be described.

<Mobile Robot 100>
<Seating Part 10>

Figure 2:
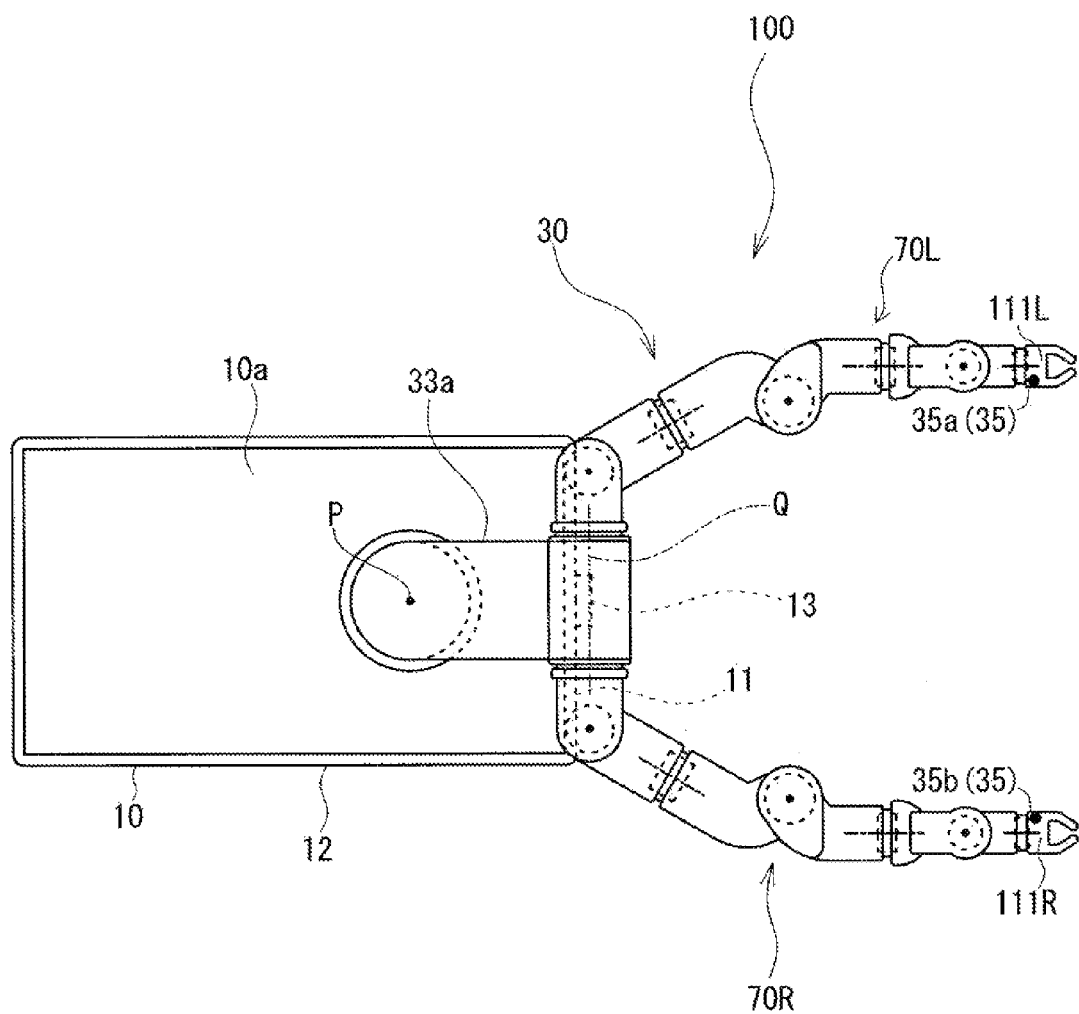
FIG. 2 shows a plain view of a seating part of the mobile robot shown in FIG. 1.

Mobile robot 100 is made up of seating part 10, moving apparatus 20, and robot part 30. Seating part 10 is a seating portion for mounting robot part 30 thereon. FIG. 2 is a plain view of seating part 10 in mobile robot 100. According to the present embodiment, seating part 10 is formed of an approximately rectangular parallelepiped. In other words, seating part 10 is formed of an approximate rectangle in a plain view. In FIG. 2, seating part 10 includes first surface 11 and second surface 12. According to the present embodiment, first surface 11 is a front side surface while second surface 12 is a right side surface, with both surfaces being adjacent to each other. First surface 11 and second surface 12 are not limited to the front side surface and the right side surface. First surface 11 and second surface 12 of seating part 10 are not always adjacent to each other. First surface 11 and second surface 12 are the elevation surfaces of seating part 10.

Here, plain view means the arrow view along vertical axis P to be described later, with the approximate rectangle in plain view having substantially the same meaning as that in which the sectional form made of the plain orthogonal to vertical axis P is formed of an approximate rectangle.

For example, the second surface may be the left side surface. Any of four elevation surfaces, namely, the front side surface, the rear side surface, the right side surface, and the left side surface of seating part 10 can be freely used as the first surface or the second surface. In addition, seating part 10 is not limited to an approximate rectangle shape. In other words, if a plurality of surfaces opposed to (in other words, facing or confronting) the work (for example, work M1 on work table 51) are provided upon the operation of robot part 30, the shape of seating part 10 may be appropriately determined. If seating part 10 has first surface 11 and second surface 12 and robot part 30 can carry out the operations on a plurality of works (for example, work M1 opposing first surface 11 and work M2 opposing second surface 12) without moving seating part 10, the shape of seating part 10 is not limited and may be an approximate triangle, a quarter sector, or a hexagonal shape in a plain view.

Connection port 13 is arranged on front side surface (the first surface) 11 of the seating part 10. This connection port 13 is a charging port to be connected to power connectors 50 upon charging. Power connectors 50 are arranged at various regions, for example, in the vicinity of work position A1 or work position A2 of mobile robot 100, making it possible to charge a battery during the operation of mobile robot 100.
<Moving Apparatus 20>

Figure 3:
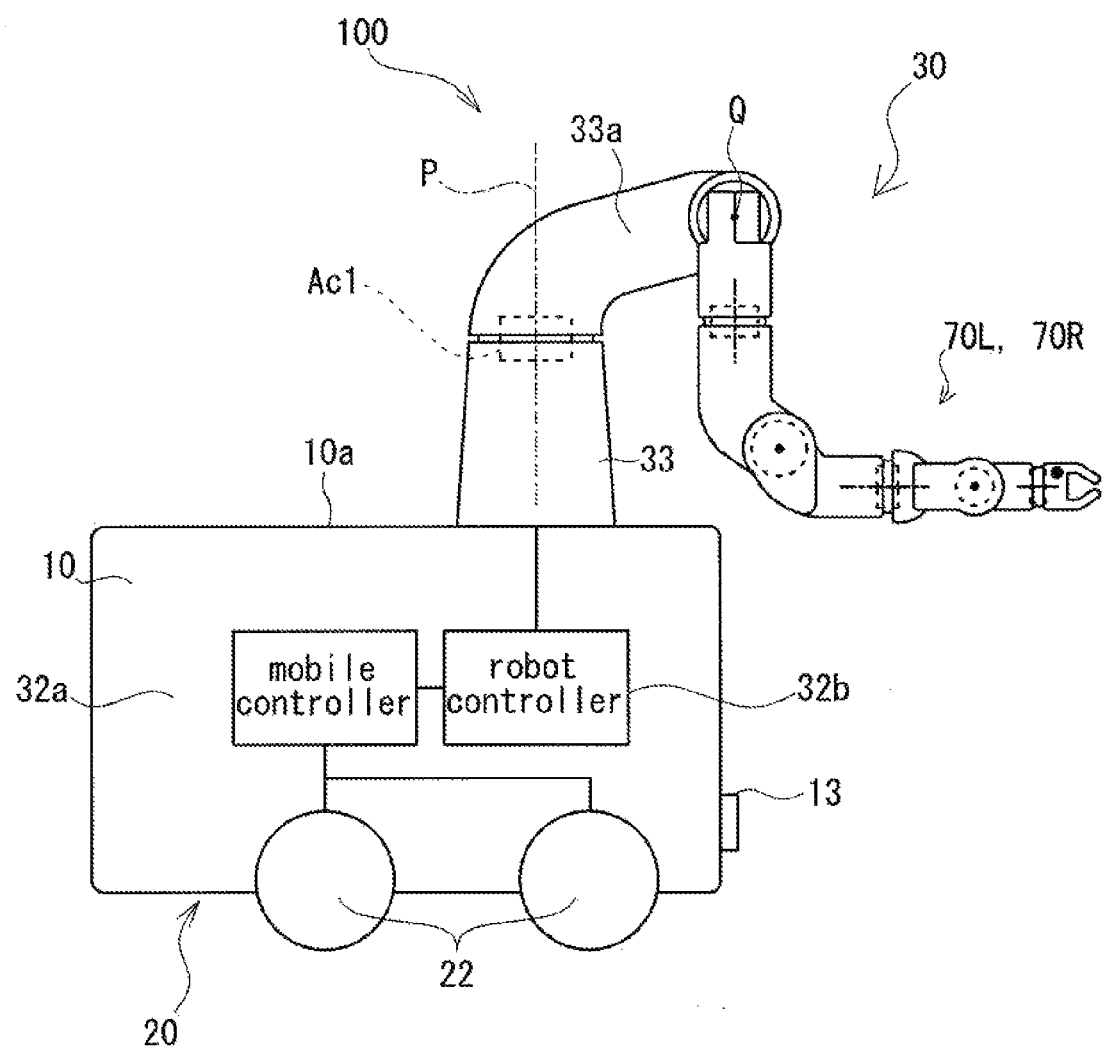
FIG. 3 shows a block diagram illustrating the outline of the inner configuration of the mobile robot shown in FIG. 1.

Here, moving apparatus 20 moves seating part 10 among work position A1, work position A2, and work position A3. FIG. 3 shows a block diagram illustrating the outline of the inner configuration of mobile robot 100. Moving apparatus 20, including, for example, a motor (not illustrated) and wheel 22, is configured such that it can move or revolve seating part 10 along work floor F. Moving apparatus 20 moves seating part 10 to a specific destination at a specific moving timing based on moving instructions according to a moving program. Wheel 22 may be configured by including an Omni wheel, a mecanum wheel, and a crawler since the form of moving apparatus 20 can be appropriately applied. In other words, moving apparatus 20 may be provided with a driving means for driving apparatuses and a transport means driven by a driving means not limited to the types of a motor and wheel 22.

Moving apparatus 20 includes controller 32 therein. Controller 32 includes, for example, mobile controller 32a for controlling the operation of moving apparatus 20 and robot controller 32b for controlling the operation of robot part 30. Each of controllers 32a, 32b may respectively have a processing unit and a storage. Mobile controller 32a transmits moving instructions to the motor based on the moving program stored in the storage of mobile controller 32a. The moving program may be stored in the storage of robot controller 32b as part of an operation program. In this case, based on the execution of the operation program, mobile controller 32a transmits the moving instructions to the motor.
<Robot Part 30>

Robot part 30 is made up of base part 33, body 33a, and arms 70L, 70R. Robot part 30 is an operational subject for carrying out the operations at work positions A1 to A3. Robot part 30 is attached to attaching surface 10a of seating part 10. Attaching surface 10a is the upper surface in the embodiment.

Base part 33 of robot part 30 is fixed to attaching surface 10a of seating part 10 with body 33a being rotatable for base part 33. Body 33a can rotate around vertical axis P (also referred to as axis P) that is vertically elongated from attaching surface 10a. Attaching surface 10a is typically parallel to the work floor surface. Attaching surface 10a is a horizontal surface and vertical axis P is vertically elongated since the work floor surface is typically a horizontal surface. For the case in which the work floor surface is an inclined surface, attaching surface 10a is inclined in accordance with the inclined angle and axis P is also elongated while being vertically inclined.

Mobile robot 100 can carry out the operation process at both work table (fixed base) 51 facing front side surface 11 and work table (fixed base) 52 facing right side surface 12 at work position A1 since body 33a can rotate around axis P. According to the present embodiment, work table 51 and work table 52 are orthogonally arranged in a plain view. Robot part 30 carries out the same operations (assembly, for example) at both work table 51 and work table 52. It is possible to continuously complete two operations (assembly) for a short time through the operation by the robot part 30 at work table 52 further to the operation at work table 51, facilitating the improvement of working efficiency.

In the same manner, mobile robot 100 can carry out the operation process at both work table (fixed base) 53 facing front side surface 11 and work table (fixed base) 54 facing right side surface 12 at work position A2. According to the present embodiment, work table 53 and work table 54 are orthogonally arranged in a plain view. Robot part 30 carries out the same operations (assembly, for example) at both work table 53 and work table 54. An explanation of the operation of work position A2 is herein omitted since the operation of robot part 30 of work position A1 is substantially identical to the operation of robot part 30 at work position A2.

Figure 4:
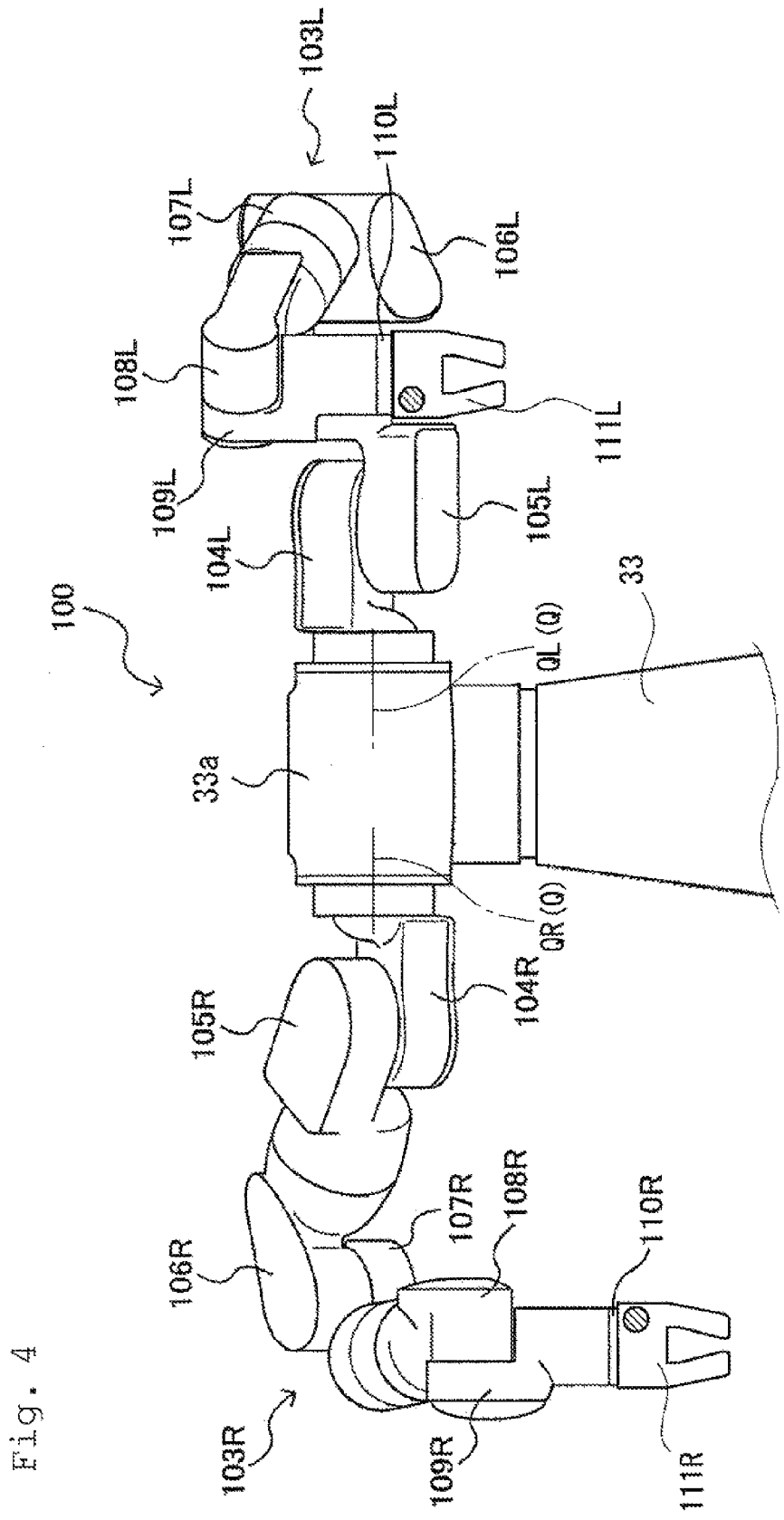
FIG. 4 shows an external view in the vicinity of a body for explaining the schematic configuration of a robot part.
Figure 5:
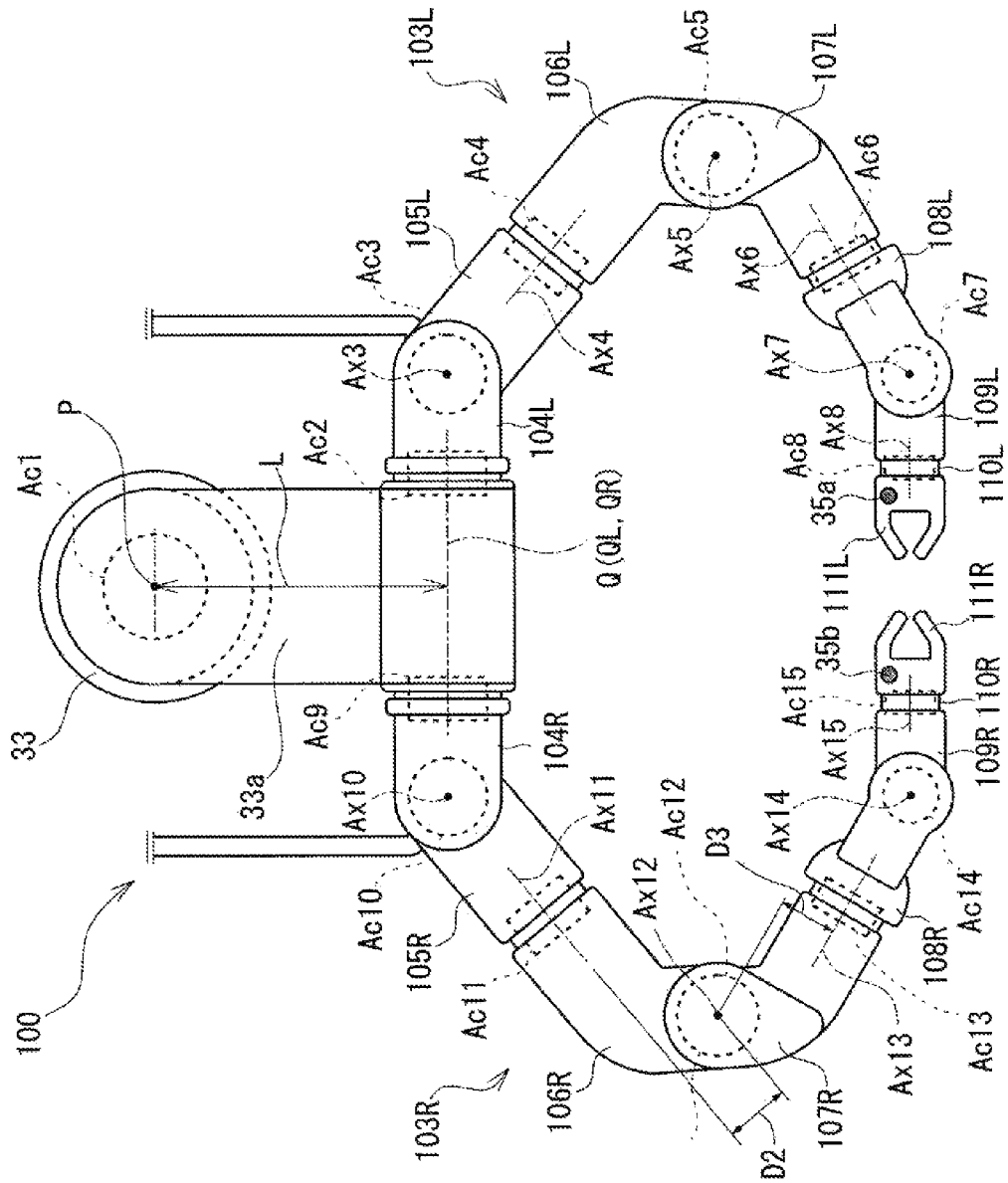
FIG. 5 shows a plain view of the robot part.

According to the present embodiment, two arms 70L, 70R are connected to body 33a. In other words, robot part 30 is a dual-arm type. FIG. 4 shows an external view in the vicinity of body 33a for explaining the schematic configuration of robot part 30, while FIG. 5 shows a plain view of robot part 30.

Base part 33 is fixed to attaching surface 10a by an anchor bolt (not illustrated), etc. Body 33a has a first joint part provided with actuator Ac1 which is rotatably driven around axis P. This body 33a, which is set such that it is capable of revolving around base part 33 via the first joint part, revolves on a plain substantially parallel to attaching surface 10a through driving actuator Ac1 placed in the first joint part. In addition, this body 33a has separately composed arms 70L, 70R, one of which is connected to the side (right side in FIG. 4 and FIG. 5) and the other of which is connected to other side (left side in FIG. 4 and FIG. 5).

Arm 70L, which is a manipulator provided to a certain side of body 33a, is made up of shoulder (connection part) 104L, upper arm A 105L, upper arm B 106L, lower arm 107L, wrist A 108L, wrist B 109L, flange 110L, hand (operation part) 111L, and second to eighth joint parts respectively provided with actuators Ac2 to Ac8 to respectively drive these respective parts.

Shoulder 104L, which is rotatably connected to body 33a via the second joint part, rotates around rotational axis QL that is substantially-parallel to attaching surface 10a via the driving of actuator Ac2 placed on the second joint part. Rotational axis QL is an orthogonal axis that is orthogonally elongated from axis P. However, rotational axis QL does not intersect axis P since it is offset from axis P to be described later.

Upper arm A 105L is rotatably connected to shoulder 104L via the third joint part while revolving around rotational axis Ax3 orthogonal to rotational axis QL via the driving of actuator Ac3 placed on the third joint part. Upper arm B 106L is rotatably connected to the front end of upper arm A 105L via the fourth joint part while rotating around rotational axis Ax4 orthogonal to rotational axis Ax3 via the driving of actuator Ac4 placed on the fourth joint part.

Lower arm 107L is rotatably connected to upper arm B 106L via the fifth joint part while revolving around rotational axis Ax5 orthogonal to rotational axis Ax4 via the driving of actuator Ac5 placed on the fifth joint part.

Wrist A 108L is rotatably connected to the front end of lower arm 107L via the sixth joint part while rotating around rotational axis Ax6 orthogonal to rotational axis Ax5 via the driving of actuator Ac6 placed on the sixth joint part. Wrist B 109L is rotatably connected to wrist A part 108L via the seventh joint part while revolving around rotational axis Ax7 orthogonal to rotational axis Ax6 through driving of actuator Ac7 placed on the seventh joint part.

Flange 110L, which is rotatably connected to the front end of wrist B 109L via the eighth joint part, rotates around rotational axis Ax8 orthogonal to rotational axis Ax7 via the driving of actuator Ac8 placed on the eighth joint part.

Hand 111L, which is attached to the front end of flange 110L, dependently rotates in accordance with the rotation of flange 110L. With, for example, fingers capable of being operated by an actuator, hand 111L can grasp or release components according to the open and close operation of the fingers.

Arm 70R, which is a manipulator provided on the other side of body 33a, has a configuration similar to the above-described arm 70L. This arm 70R is made up of shoulder (connection part) 104R, upper arm A 105R, upper arm B 106R, lower arm 107R, wrist A 108R, wrist B 109R, flange 110R, hand (operation part) 111R, and ninth to fifteenth joint parts respectively provided with actuators Ac9 to Ac15 to drive these respective parts.

Shoulder 104R, which is rotatably connected to body 33a via the ninth joint part, rotates around rotational axis QR that is substantially-parallel to attaching surface 10a via the driving of actuator Ac9 placed on the ninth joint part. Rotational axis QR is an orthogonal axis that is orthogonally elongated to axis P. Rotational axis QR does not intersect axis P as it is offset from axis P to be described later. Rotational axis QR may be identical to rotational axis QL. According to the present embodiment, a description will hereinafter be provided assuming that rotational axis QR is identical to rotational axis QL (orthogonal axis Q).

Upper arm A part 105R is rotatably connected to shoulder 104R via the tenth joint part while revolving around rotational axis Ax10 orthogonal to rotational axis QR (orthogonal axis Q) via the driving of actuator Ac10 placed on the tenth joint part. Upper arm B 106R is rotatably connected to the front end of upper arm A 105R via the eleventh joint part while rotating around Ax11 orthogonal to rotational axis Ax10 via the driving of actuator Ac11 placed on the eleventh joint part.

Lower arm 107R is rotatably connected to upper arm B 106R via the twelfth joint part while revolving around rotational axis Ax12 orthogonal to rotational axis Ax11 via the driving of actuator Ac12 placed on the twelfth joint part.

Wrist A 108R is rotatably connected to the front end of lower arm 107R via the thirteenth joint part while rotating around rotational axis Ax13 orthogonal to rotational axis Ax12 via the driving of actuator Ac13 placed on the thirteenth joint part. Wrist B 109R is rotatably connected to wrist A 108R via the fourteenth joint part while revolving around rotational axis Ax14 orthogonal to rotational axis Ax13 via the driving of actuator Ac14 placed on the fourteenth joint part.

Flange 110R, which is rotatably connected to the front end of wrist B 109R via the fifteenth joint part, rotates around rotational axis Ax15 orthogonal to rotational axis Ax14 via the driving of actuator Ac15 placed on the fifteenth joint part.

Hand 111R, which is attached to the front end of flange 110R, dependently rotates in accordance with the rotation of flange 110R. Hand 111R, for example, along with hand 111L, which is provided with fingers capable of being operated by an actuator, can grasp or release components according to the open and close operation of the fingers.

According to this embodiment, arms 70L, 70R have joint parts, namely, seven degrees of freedom (redundant degrees of freedom), however, the degrees of freedom of arms 70L, 70R are not limited to "seven."

The structural materials of shoulders 104L, 104R, upper arms A 105L, 105R, upper arms B 106L, 106R, lower arms 107L, 107R, wrists A 108L, 108R, wrists B 109L, 109R, flanges 110L, 110R, and hands 111L, 111R of these arms 70L, 70R may be metal materials including iron, aluminum, etc.

As shown in FIG. 4, body 33a is formed such that it is horizontally pushed out forward to base part 33 from the first joint part to the second and ninth joint parts. As a result, axis P of the first joint part and respective rotational axis QL, QR (orthogonal axis Q) of the second and ninth joint parts are offset substantially-parallel to attaching surface 10a for distance D1. Thereby, the space located below shoulders 104L, 104R can be used as operation space. The reachable ranges of arms 70L, 70R can be enlarged by rotating body 33a around axis P.

The shape of upper arm B 106R is determined such that rotational axis Ax11 of the eleventh joint part and rotational axis Ax12 of the twelfth joint part are offset along the extension line of rotational axis Ax12 for distance D2 along the arrow view. The shape of lower arm 107R is determined such that rotational axis Ax12 of the twelfth joint part and rotational axis Ax13 of the thirteenth joint part are offset along the extension line of rotational axis Ax12 for distance D3 along the arrow view.

The offset distance between rotational axis Ax11 and rotational axis Ax13 becomes (D2+D3) when the posture of arm 70R is made such that rotational axis Ax11 is substantially-parallel to rotational axis Ax13. Thereby, upon bending the twelfth joint part corresponding to the "elbow" of a human being, it is possible to largely secure a clearance between upper arm A 105R and upper arm B 106R corresponding to the "upper arm" of a human being and lower arm A 107R corresponding to the "lower arm" of a human being. It is possible to bend the twelfth joint part such that rotational axis Ax11 is substantially-parallel to rotational axis Ax13. The operational degree of freedom of arm 70R is not so limited when hand 111R is brought close to body 33a.

Although not clearly shown in FIG. 5, the same goes for the case with arm 70L, namely, the shape of upper arm B 106L is determined such that rotational axis Ax4 of the fourth joint part and rotational axis Ax5 of the fifth joint part are offset for distance D2 along the extension line of rotational axis Ax5 in the arrow view. The shape of lower arm 107L is determined such that rotational axis Ax5 of the fifth joint part and rotational axis Ax6 of the sixth joint part are offset along the extension line of rotational axis Ax5 for distance D3 in the arrow view. The offset distance between rotational axis Ax4 and rotational axis Ax6 becomes (D2+D3) when the posture of arm 70L is made such that rotational axis Ax4 is substantially-parallel to rotational axis Ax6.

According to the embodiment, robot part 30 of a dual-arm type has been described, however, robot part 30 may have one, three or more arms.

Figure 6A:
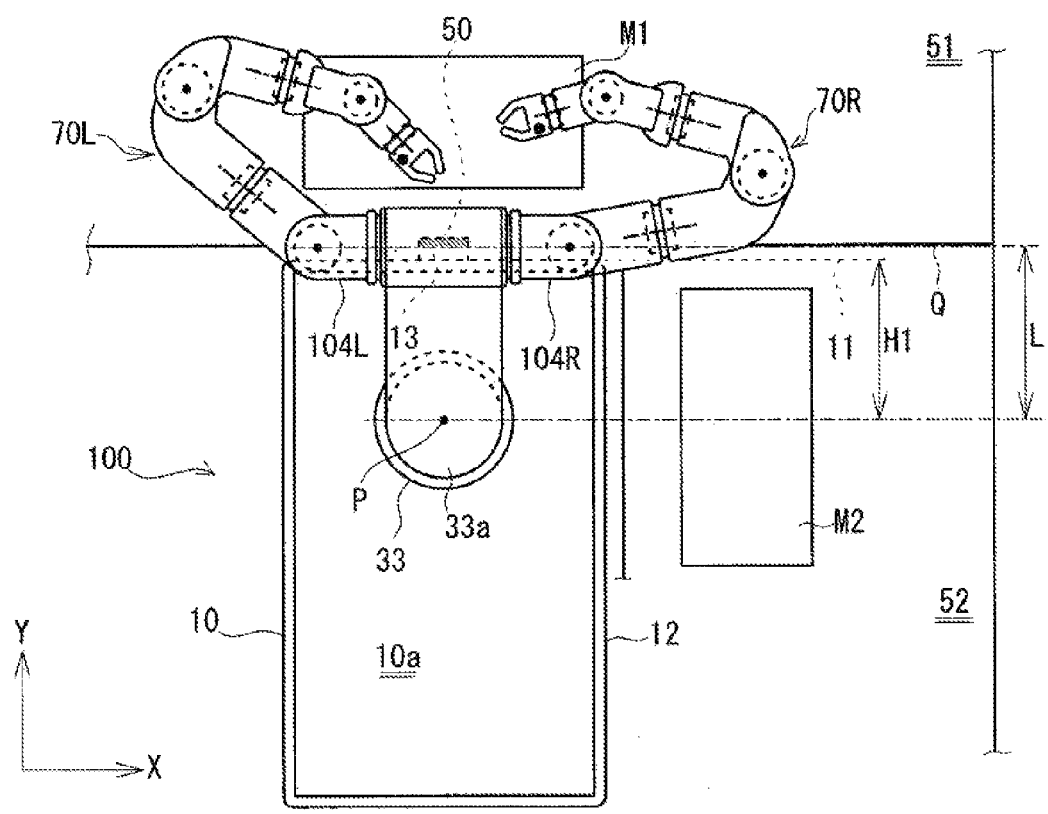
FIG. 6A shows a plain view of the mobile robot placed at the work position, as well as the posture at which the robot carries out the operation for work M1 placed on the front side.
Figure 6B:
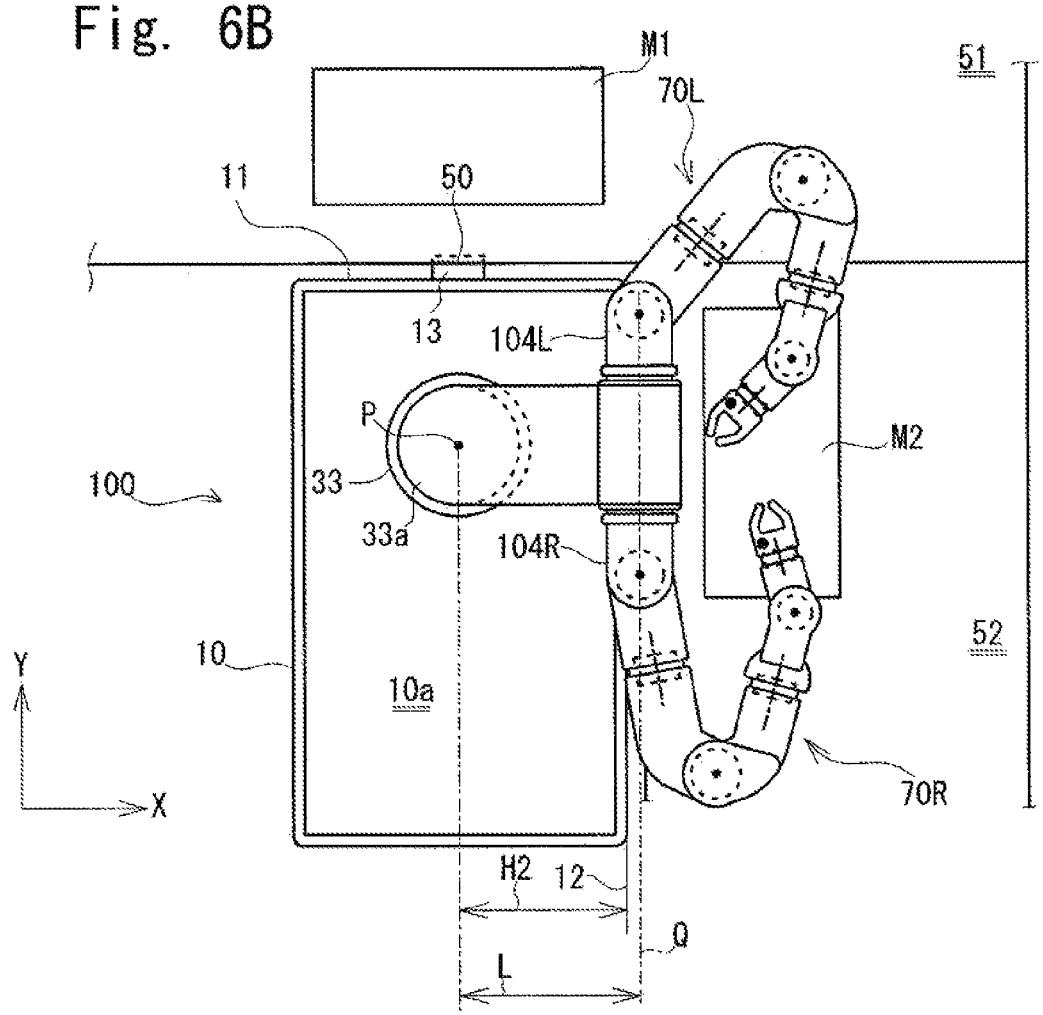
FIG. 6B shows a plain view of the mobile robot placed at the work position, as well as the posture at which the robot carries out the operation for work M2 placed on the right side.
Figure 7:
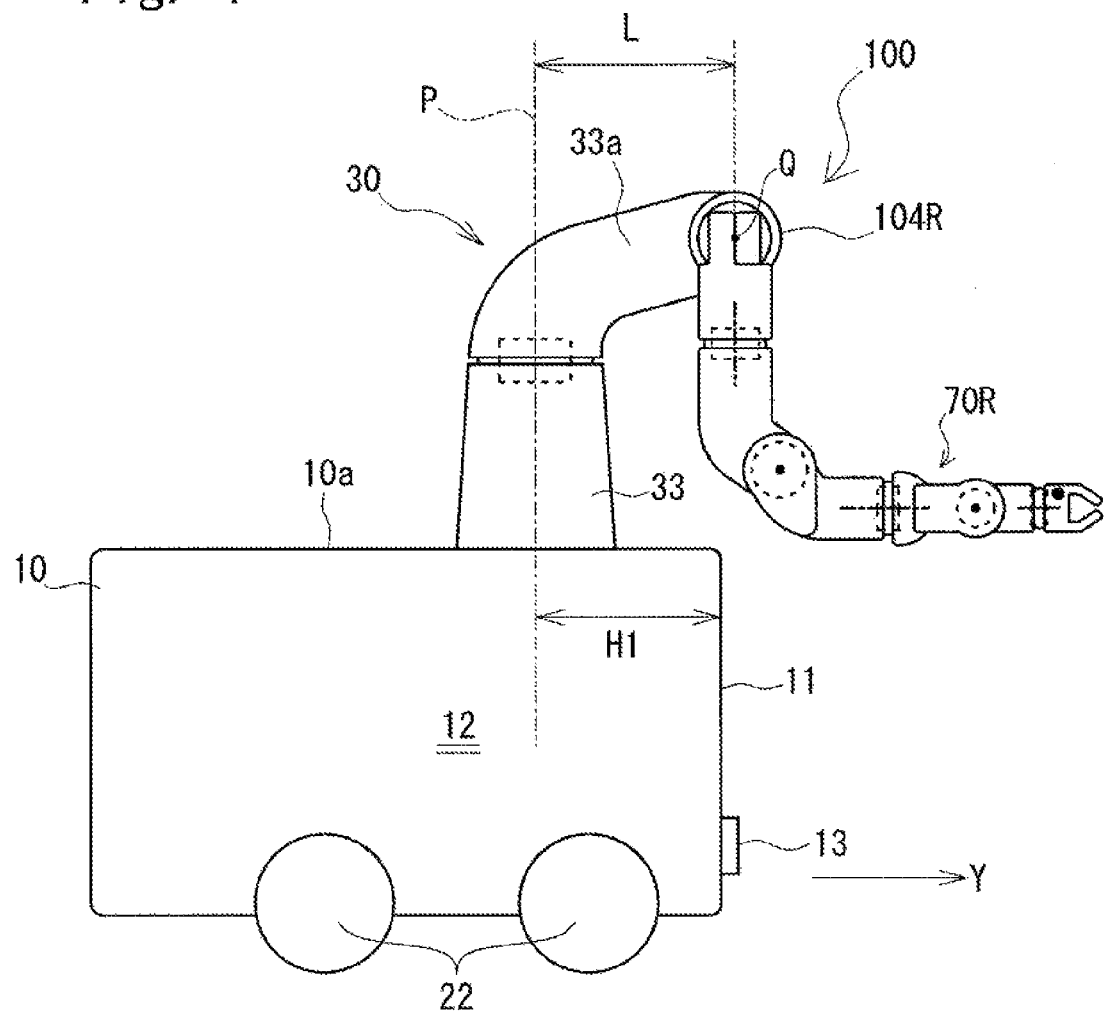
FIG. 7 shows a side view of the mobile robot at the posture at which it carries out the operation for work M1 placed on the front side.

FIG. 6A and FIG. 6B show plain views of mobile robot 100 at work position A1. At work position A1, front side surface 11 of seating part 10 faces work table 51 (and work M1 thereon), while right side surface 12 faces work table 52 (and work M2 thereon). FIG. 6A shows the posture at which mobile robot 100 carries out the operation for work M1 on work table 51, and FIG. 6B shows the posture at which mobile robot 100 carries out the operation for work M2 on work table 52. FIG. 7 shows a side view of the posture at which mobile robot 100 carries out the operation for work M1.

As shown in FIGS. 6A, 6B and FIG. 7, orthogonal axis Q (hereinafter, also referred to as axis Q) is offset to axis P for specific offset amount L. Offset amount L is no less than the shortest distance H1 between axis P and front side surface 11. In addition, offset amount L is no less than the shortest distance H2 between axis P and right side surface 12.

Sometimes the operation cannot be carried out at right-side work table 52 using an operation process being same as the operation process carried out at front-side work table 51 when offset amount L is lower than shortest distance 111 or lower than shortest distance H2. For example, for the case in which offset amount L is no less than shortest distance H2 but lower than shortest distance H1, front side surface 11 protrudes from axis Q in the forward direction shown in FIG. 6A and FIG. 6B. Thus, it is possible to carry out the operation approximately directly below shoulder 104L, 104R for right-side work M2, however, it is not possible to carry out the operation approximately directly below shoulder 104L, 104R for front-side work M1 using the same operation process.

However, if offset amount L is no less than shortest distance H1 and no less than shortest distance H2, it is possible to carry out the operation approximately directly below shoulders 104L, 104R for both work M1 and work M2 using the same operation process. Here, to be capable of carrying out the operation using the same operation process means that the operation instructions sent to robot part 30 by the operation program are common in the operation for work M1 on work table 51 and in the operation for work M2 on work table 52. Obviously, robot part 30 should be opposed to work table 51 during the operation for work M1 and robot part 30 should be opposed to work table 52 during the operation for work M2.

For example, robot part 30 can carry out both operations for work M1 and work M2 by rotating body 33a for 90° around axis P. These operations for work M1 and work M2 can be carried out by the same operation instructions except for the operation instructions of rotating body 33a for 90° around axis P, namely, the operation instructions from robot controller 32b to robot part 30. Further, according to the present embodiment, shortest distance H1=shortest distance H2 is established. Accordingly, the positional relationship between arms 70L, 70R and front side surface 11 is identical to the positional relationship between arms 70L, 70R when body 33a rotates 90° around axis P and right side surface 12. For example, seating part 10 may be formed of an approximate square in a plain view, with axis P located at the diagonal center of the square.

Figure 8:
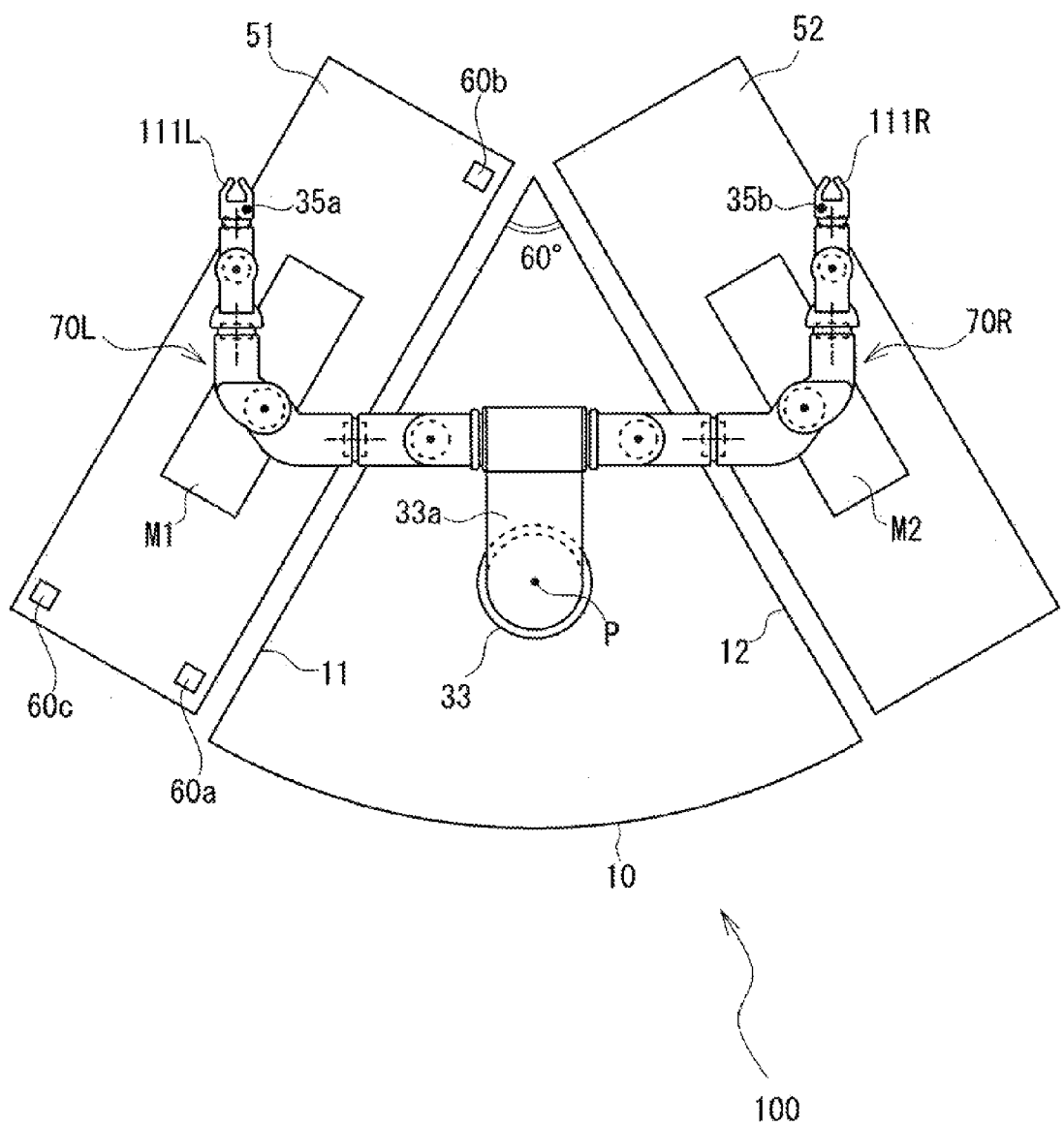
FIG. 8 shows an example in which two work tables are arranged at an angle of 60°.

The positional relationship between work table 51 and work table 52 is not limited to an orthogonal arrangement. For example, work table 51 and work table 52 may be arranged at an angle of 60° (see FIG. 8). In this case, front side surface 11 and right side surface 12 are preferably arranged at an angle of 60° in a plain view, and the rotation angle of body 33a when the operation for work M1 on work table 51 is shifted to the operation for work M2 on work table 52 is also preferably 60°. This angle can be of other degrees.

Arms 70L, 70R have a plurality of joints (first to eighth joint parts, and ninth to fifteenth joint parts), each of which are rotatable by actuators Ac2 to Ac8, Ac9 to Ac15 such as a motor. Fingered hand 111L is arranged on the front end side further than the eighth joint part arranged on the front end side of arm 70L. Fingered hand 111R is arranged on the front end side further than the fifteenth joint part arranged on the front end side of arm 70R. Hands 111L, 111R serve to carry out operations such as grasping, screw clamping, welding, etc. for works M1, M2 arranged on work tables 51, 52.

Sensors (detecting parts) 35 are mounted near hands 111L, 111R, namely, on the front side further than the eighth joint part or the fifteenth joint part. These sensors 35 detects a plurality of standard marks (benchmark indexes) 60 for positioning arranged on the work tables 51, 52. Optical sensors, image pickup devices, magnet sensors, electrostatic sensors, etc. are applicable to sensors 35. According to the present embodiment, sensors 35 are optical sensors. Sensor 35a is arranged near hand 111L while sensor 35b is arranged near hand 111R. The detection process of standard marks 60 by sensors 35 (35a, 35b) will be described later.

Figure 9A:
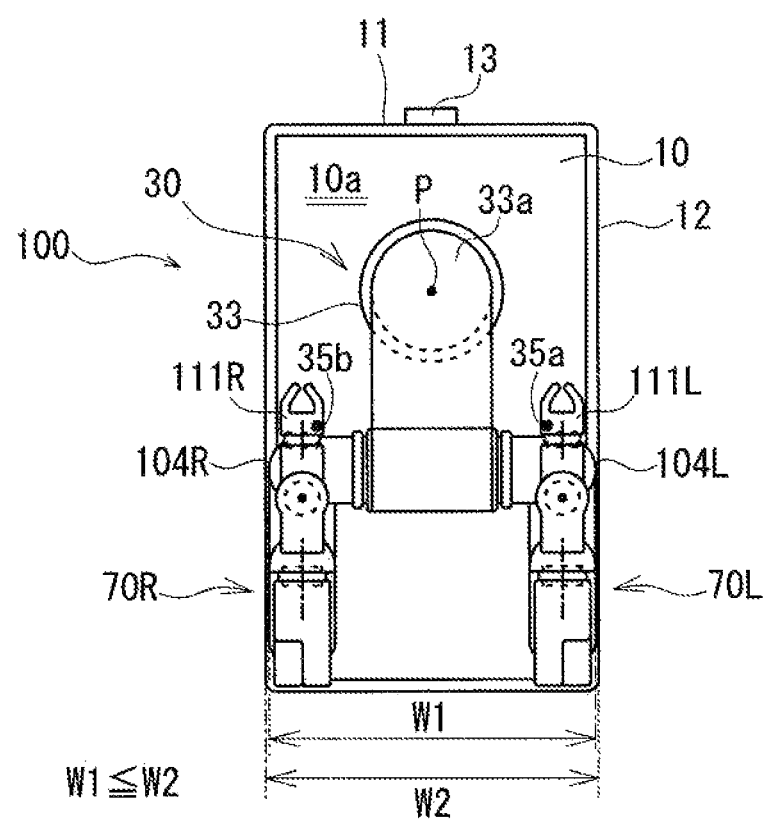
FIG. 9A shows a plain view of a robot part with arms stored.
Figure 9B:
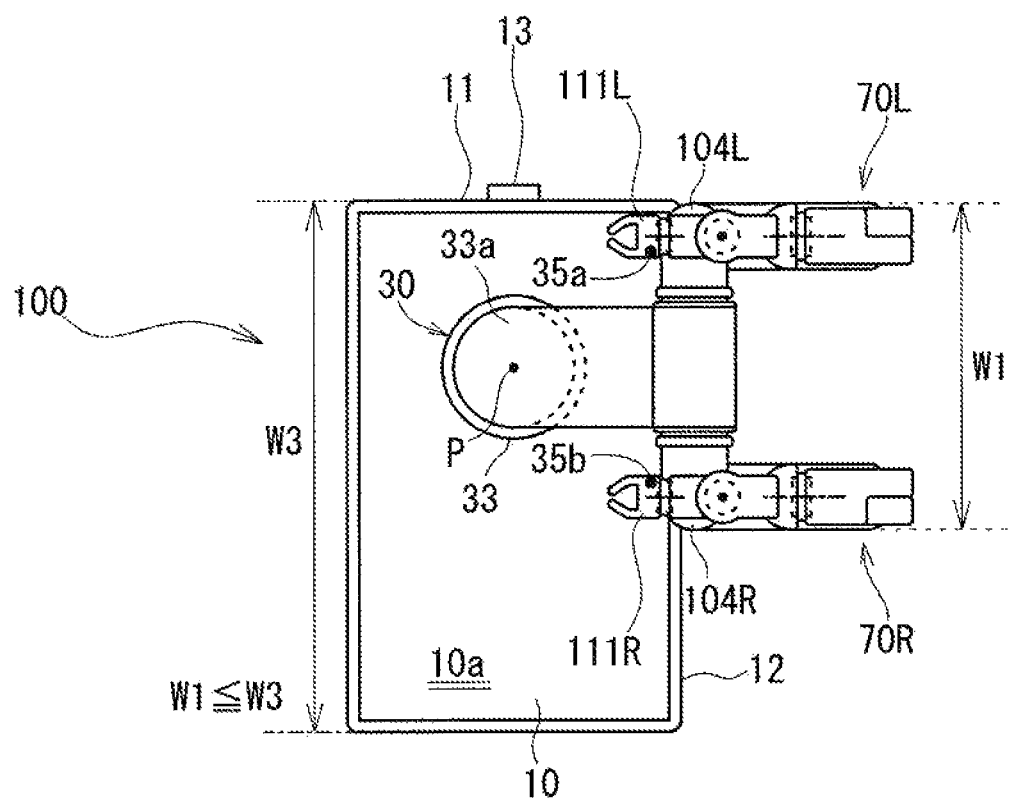
FIG. 9B shows a plain view of the robot part in which the robot is directed to the right side.

Robot part 30 can be stored within seating part 10 in a plain view. FIG. 9A and FIG. 9B show plain views of robot part 30 of stored status. As shown in FIG. 9A, stored robot part 30 faces the direction in which it rotates 180° around axis P from the direction of front side surface 11. In this case, respective joints are operated such that arms 70L, 70R are postured to avoid protruding to the outside of seating part 10 from a top view (plain view).

Robot part 30 faces right side surface 12 in FIG. 9B. The state in which robot part 30 faces front side surface 11 refers to the state in which axis Q is substantially parallel to front side surface 11. The state in which robot part 30 faces front side surface 12 refers to the state in which Q axis is substantially parallel to right side surface 12.

In the above states, arms 70L, 70R are horizontally stored within the range from shoulder 104L to shoulder 104R. As shown in FIG. 9A, regarding the manner in which arms 70L, 70R are stored, lateral width (horizontal width) W1 of robot part 30 is the outermost width from shoulder 104L to shoulder 104R.

Lateral width W1 of robot part 30 is determined to be no greater than lateral width W2 of seating part 10. Further, in the state shown in FIG. 9A, shoulder 104L and shoulder 104R do not horizontally or longitudinally protrude from lateral width W2 of seating part 10 to the outside.

Mobile robot 100 in motion is configured such that it moves when robot part 30 is stored as shown in FIG. 9A.

Accordingly, when mobile robot 100 is moving while passing through a narrow passage, etc. with robot part 30 facing front side surface 11, it is possible to avoid the situation in which robot part 30 is obstructed by obstacle K such as a pillar, although seating part 10 can pass through the passage.

As shown in FIG. 9B, lateral width W1 of robot part 30 is determined to be no greater than longitudinal width W3 of seating part 10, and shoulder 104L and shoulder 104R more preferably do not longitudinally protrude from longitudinal width W3 of seating part 10 to the outside. Thereby, even for the case in which mobile robot 100 exceptionally moves (for example, horizontally moves) while passing through a narrow passage with robot part 30 facing right side surface 12, it is possible to avoid the situation in which robot part 30 is obstructed by obstacle K, although seating part 10 can pass through the passage.

<Standard Marks 60>

Standard marks 60 (60a to 60c) are benchmark indexes to position for the mobile robot 100. According to the present embodiment, three standard marks 60a to 60c are arranged on work table 51. Work tables 51, 52 are fixed bases in order for robot part 30 to carry out the operations for works M1, M2 using arms 70L, 70R. Work objects M1, M2 such as assemblies are fixed on work tables 51, 52. Assembly, etc. of works M1, M2 is carried out when robot part 30 carries out operations such as grasping, screw clamping, welding, etc. for works M1, M2.

Work objects M1 and work M2 are similar objects. The positional relationship between robot part 30 and work M1 when robot part 30 faces work table 51 is identical to the positional relationship between robot part 30 and work M2 when robot part 30 faces work table 52.

Positioning of mobile robot 100 within work position A1 is carried out upon detection of standard marks 60 by sensor 35 after mobile robot 100 moves from other places (for example, work position A2 or work position A3) to work position A1. Positioning of mobile robot 100 refers to the correction of coordinate positions during the operations of arms 70L, 70R by grasping the stopping points of mobile robot 100.

Robot part 30 can grasp the position of Y direction (anteroposterior direction) and the direction within surface XY (rotational posture) of itself upon detection of standard marks 60a and 60b by sensor 35. Robot part 30 can grasp the position of X direction (lateral direction) of itself upon detection of standard mark 60c by sensors 35. Here, Y direction is the anteroposterior direction shown in FIG. 6A, while X direction is the horizontal direction shown in FIG. 6A. Surface XY is the surface orthogonal to axis P, substantially meaning the floor surface of work floor F.

Robot part 30 can grasp coordinate positions XY and the direction on surface XY of itself by detecting three standard marks 60a to 60c, making it possible to compute correction values related to arms 70L, 70R. Standard marks 60 may be an optical detection target (for example, an optical reflector such as a mirror, or a cross mark such as "+", etc.).

Power connector 50 to be connected to connection port 13 of mobile robot 100 at work position A1 is arranged on a portion of work table 51. Accordingly, it is possible to charge mobile robot 100 while carrying out operation processes at work position A1. Further, power connector 50 may be arranged on work table 53 in response to connection port 13 of mobile robot 100 stopping at work position A2.

<Description of the Moving Process>

Subsequently, the moving process of this mobile robot 100 will be described. The moving process is substantially carried out based on control instructions from mobile controller 32a. Mobile robot 100 moves on work floor F shown in FIG. 1. Mobile robot 100 carries out the operations at work position A1, work position A2, and work position A3. For example, mobile robot 100 moves from work position A1 to work position A2 in order to carry out the operations at work position A2, from work position A2 to work position A3 in order to carry out the operations at work position A3, and from work position A3 to work position A1 in order to carry out the operations at work position A1. The dotted line R of FIG. 1 shows a passage through which mobile robot 100 moves to work positions A1, A2, A3 in series and returns to work position A1.

Work table 51 faces front side surface 11 and work table 52 faces right side surface 12 when mobile robot 100 is located at work position A1. Work object M1 is mounted on work table 51, while work M2 is mounted on work table 52. Work table 53 faces front side surface 11 and work table 54 faces right side surface 12 when mobile robot 100 is located at work position A2. Work object M3 is mounted on work table 53, while work M4 is mounted on work table 54.

Work table 55 is arranged at work position A3. Front side surface 11 cannot face work table 55 when mobile robot 100 is located at work position A3 as obstacle K such as a pillar is mounted on work floor F. Therefore, mobile robot 100 stops within work position A3 with right side surface 12 facing work table 55. Work object M5 is mounted on work table 55. Work objects M1 to M5 are substantially similar works while necessary operations for respective works are also similar.

Mobile robot 100 at work position A1 carries out the operations for work M1 and the operations for work M2. The operation for work M1 is carried out with robot part 30 facing front side surface 11 while the operation for work M2 is carried out with robot part 30 facing right side surface 12 by rotating body 33a for 90° around axis P. The positional relationship between robot part 30 facing front side surface 11 and work M1 is substantially identical to the positional relationship between robot part 30 facing right side surface 12 and work M2. In other words, robot part 30 can carry out the operation for work M1 and the operation for work M2 through the same operation process, except that the rotation posture of body 33a for operation part 10 is different by 90°.

Mobile robot 100 at work position A2 carries out the operations for work M3 and the operations for work M4. The operation for work M3 is carried out with robot part 30 facing front side surface 11 while the operation for work M4 is carried out with robot part 30 facing right side surface 12 by rotating body 33a for 90° around axis P. The positional relationship between robot part 30 facing front side surface 11 and work M3 is substantially identical to the positional relationship between robot part 30 facing right side surface 12 and work M4. In other words, robot part 30 can carry out the operation for work M3 and the operation for work M4 through the same operation process, except that the rotation posture of body 33a for operation part 10 is different by 90°. Further, for the case in which the posture of robot part 30 is the same, the positional relationship between robot part 30 with mobile robot 100 located at work position A1 and work M1 is substantially identical to the positional relationship between robot part 30 with mobile robot 100 located at work position A2 and work M3.

Mobile robot 100 at work position A3 carries out the operations for work M5. The operation for work M5 is carried out with robot part 30 facing right side surface 12. The positional relationship between robot part 30 facing right side surface 12 at work position A2 and work M4 is substantially identical to the positional relationship between robot part 30 facing right side surface 12 at work position A3 and work M5. In other words, robot part 30 can carry out the operation for work M4 at work position A2 and the operation for work M5 at work position A3 by the same operation process.

As described above, mobile robot 100 carries out the operations for works M1 to M5 while moving between work positions A1 to A3. The operations for works M1 to M5 can be carried out through substantially the same operation process, except that body 33a rotates 90° around axis P. Further, mobile robot 100 can be charged at work position A1 and work position A2 by connecting power connector 50 to connection port 13.

<Description of the Positioning Process>

Next, the positioning process of mobile robot 100 will be described. The positioning process and operation process are substantially carried out based on control instructions from robot controller 32b. The positioning process is carried out before mobile robot 100 starts the operation process at a specific work position. For example, the positioning process is carried out before the operation is started at work position A2 after mobile robot 100 moves from work position A1 to work position A2, before the operation is started at work position A3 after mobile robot 100 moves from work position A2 to work position A3, and before the operation is started at work position A1 after mobile robot 100 moves from work position A3 to work position A1.

Mobile robot 100 carries out the positioning process after stopping at a certain work position and before starting the operation at this work position. There is no need for another positioning process to be carried out while mobile robot 100 is stopped at this position. For example, for the case in which the operation for work M1 is initially carried out at work position A1, and the operation for work M2 is subsequently carried out, if the positioning process is carried out before the operation process for work M1 is carried out, there is no need to carry out the positioning process work M1 after the operation process is carried out and before the operation process for work M2 is carried out. Accordingly, there is no need to arrange the standard marks used for the positioning process on work table 52.

It is the same for the work position A2. For the case in which the operation for work M4 is carried out after the operation for work M3, the positioning process may be carried out before the operations for work M3. There is no need for arranging the standard marks on work table 54 since there is no need for carrying out the positioning process after the operation for work M3 and before the operation for work M4. Obviously, the second positioning process at each work position may be carried out before starting the operations for work M2 and work M4.

Hereinafter, the positioning process to be carried out at work position A1 before starting the operation process for work M1 will be described. The positioning processes at work position A2 and at work position A3 are substantially the same.

Figure 10:
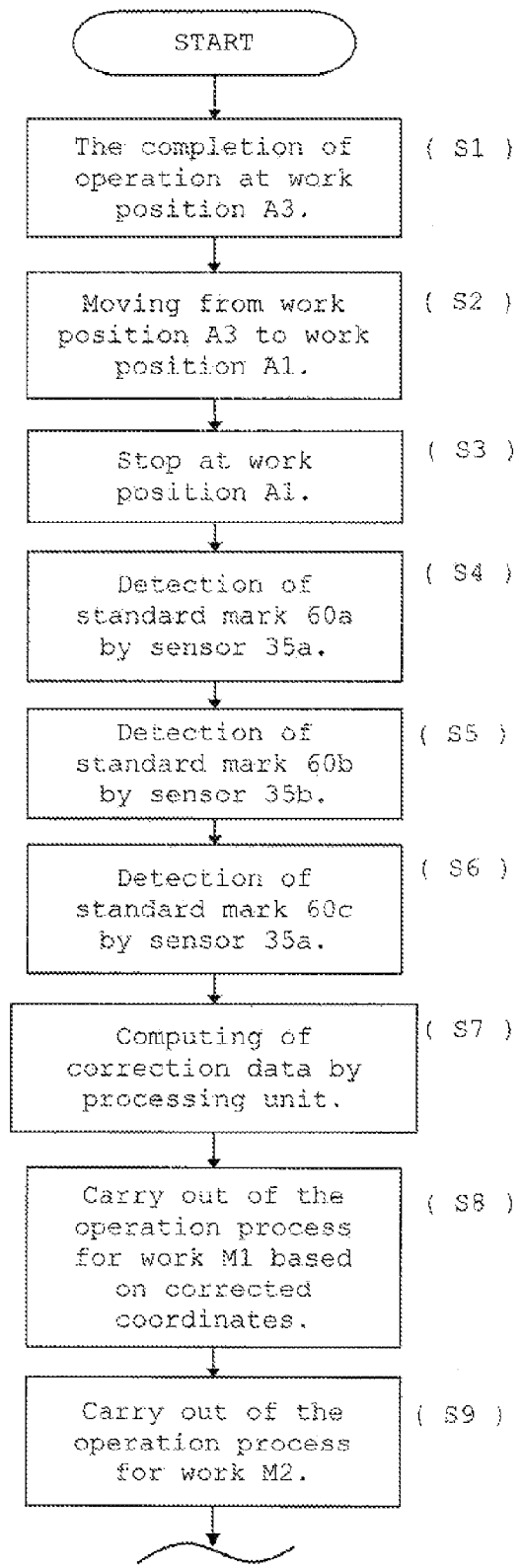
FIG. 10 shows a flow chart for explaining the positioning process of the mobile robot according to the embodiment.

FIG. 10 shows a flow chart explaining the positioning process of mobile robot 100. The case in which mobile robot 100 moves from work position A3 to work position A1 to start the operations at work position A1 is described in this flow chart.

When the operation at work position A3 is completed (S1), mobile robot 100 moves from work position A3 to work position A1 with arms 70L, 70R stored (S2). Arms 70L, 70R are stored before starting to move to work position A1. Mobile robot 100 preferably moves with robot part 30 facing front side surface 11, however, the present embodiment is not limited to this. Lateral width W1 of robot part 30 becomes no greater than lateral width W2 of seating part 10 (and no greater than longitudinal end W3) since arms 70L, 70R are stored upon moving of mobile robot 100, preventing robot part 30 from being obstructed by obstacle K such as a pillar.

Mobile robot 100 is connected to power connector 50 near work position A1 to be charged. In addition, in the state in which mobile robot 100 stops at work position A1, robot part 30 faces forward. The state in which robot part 30 faces forward is the state in which axis Q is substantially parallel to front side surface 11.

In other words, mobile robot 100 stops at work position A1 (S3). When mobile robot 100 stops at work position A1, mobile robot 100 is connected to power connector 50 near work position A1 to be charged. Next, the positioning process is carried out. In this positioning process, each of a plurality of sensors 35a, 35b detects a different standard mark among a plurality of standard marks 60a to 60c. Subsequently, the plurality of sensors 35a, 35b detects all of standard marks 60a to 60c. In other words, sensor 35a of left arm 70L first detects standard mark 60a (S4). Continuously or approximately simultaneously, sensor 35b of right arm 70R detects standard mark 60b (S5). Continuously or approximately simultaneously, sensor 35a of left arm 70L that has completed detection of standard mark 60a detects standard mark 60c (S6).

The detection of standard marks 60 by sensors 35 is carried out based on the execution of the operation program. In other words, the detection of standard marks 60a and 60c by sensor 35a, the detection of standard mark 60b by sensor 35b, and the detection of standard marks 60 is executed in the order of 60a, 60b, 60c is programmed in advance in the operation program while the approximate coordinate positions XY of each of the standard marks 60 are stored in a storage in robot controller 32b.

Robot controller 32b controls arm 70L such that hand 111L is located near standard mark 60a, allowing standard mark 60a to be detected by sensor 35a. Then, robot controller 32b controls arm 70R such that hand 111R is located near standard mark 60b, allowing standard mark 60b to be detected by sensor 35b. Subsequently, robot controller 32b controls arm 70L such that hand 111L is located near standard mark 60c, allowing standard mark 60c to be detected by sensor 35a.

As a result of this positioning process, it is possible to efficiently complete the detection of the plurality of standard marks 60a to 60c using a plurality of sensors 35a, 35b arranged on a plurality of arms 70L, 70R. It is also possible to shorten the time required for positioning processing along with the moving distances of arms 70L, 70R. Further, it is possible to reduce the frequency of motions of arms 70L, 70R.

Once the detection of three standard marks 60a to 60c has been completed, coordinate positions XY and the direction within surface XY of mobile robot 100 are grasped by the processing unit provided with mobile robot 100, allowing the correction data of the coordinate positions of arms 70L, 70R in the operation process to be computed (S7). Robot controller 32b may function as the above-described processing unit. Robot part 30 carries out the operation process for work M1 on work table 51 based on the corrected coordinates (S8). When the operation for work M1 has been completed, robot part 30 starts to carry out the operation process for work M2 on work table 52 (S9) while rotating body 33a for 90° around axis P.

It is possible to simplify the operation process to be incorporated in the operation program since it is possible to conform the operation process for work M1 to the operation process for work M2. Thereby, reduced capacity of the operation program and simplified debugging work are achieved. There is no need for detecting standard marks 60 and computing the correction data of the coordinates for each of work tables 51, 52. It is sufficient for one work position A1 to detect standard marks 60a to 60c at one work table 51. It is possible to correct the coordinate values for the operations on a plurality of work tables without the need to detect the standard mark at another work table 52.

The positional control of hands 111L, 111R becomes the positional control of sensors 35 since no joint is provided between sensors 35 and hands 111L, 111R. Sensors 35 can easily detect standard marks 60 by controlling hands 111L, 111R such that they are located near standard marks 60. It is also possible to reduce the errors in the correction data for the coordinates of hands 111L, 111R based on the detection results detected by sensors 35.

The embodiments have been described as above, however, various changes or modifications of the invention can be made within the scope of the invention since the present invention is not limited to these embodiments.

According to the present embodiment, for example, an example in which the work is mounted or fixed on the work table has been explained, however, the work may be mounted or fixed on the floor as the fixed base. The robot part may have one, three or more arms. The seating part may be a rectangle or a square in a plain view, or may be a triangle or other polygonal shape. The seating part may have at least two surfaces and these two surfaces do not necessarily have to be adjacent to each other. These two surfaces are preferably planar elevation surfaces, however, they may be curved surfaces.

A specific offset amount between the orthogonal axis (axis Q) in the shoulder and the vertical axis (axis P) in the body may be no less than the shortest distance between the vertical axis and the front side surface, or may be no less than the shortest distance between the vertical axis and other surfaces such as the right side surface, or may be no less than the shortest distance between the vertical axis and all side the surfaces of the seating part. Once at least the mobile robot stops at the work position, the specific offset amount may be no less than the shortest distance between the surface opposing the work table and the vertical axis. Here, both the offset amount and the shortest distance refer to the size in a plain view (in other words, the size in the arrow view in the direction along the vertical axis.)

For the case of a plurality of shoulders, if the offset amount between the orthogonal axis and the vertical axis is different for each connection part, at least the largest offset amount may be determined to be the specific offset amount. The connection port may be formed on the front side surface of the seating part or the left or right side surface thereof.

The plurality of arms may be connected to the body.

The plurality of arms may be connected to the body such that they can rotate around an orthogonal axis that is orthogonally elongated from the vertical axis, and the orthogonal axis may be offset from the vertical axis by a specific offset amount.

The seating part may be substantially a rectangular parallelepiped, and the offset amount may be no less than the shortest distance between the vertical axis and the first surface.

A connection port for electrically connecting the mobile robot to external devices may be formed on at least either the first surface or the second surface.

The robot part can be stored within the size of the seating part in the plane orthogonal to the vertical axis.

The mobile robot may further include a plurality of operation parts, each of which is mounted on each of the plurality of arms, in order to carry out the operations for the work placed on the fixed base, and a plurality of detecting parts, each of which is mounted on each of the plurality of arms, in order to detect the positions of a plurality of benchmark indexes to position arranged on the fixed base.

Each of the plurality of detecting parts may respectively detect a different benchmark index among the plurality of benchmark indexes to position, and the plurality of detecting parts may detect all of the plurality of benchmark indexes to position.

The joints may not be provided between the detecting part and the operation part.

A positioning system of the mobile robot may include the above-described mobile robot, with the mobile robot including a plurality of benchmark indexes to position arranged on the fixed base in order to be detected by a detecting part of the mobile robot.

Obviously, various changes or modifications of the invention can be made based on the above-described teachings. Accordingly, it should be appreciated that the technical features of the invention other than those described in the present application could be achieved within the scope projected by the dependent claims.

What is claimed is:

1. A mobile robot, comprising:
    a seating part;
    a moving apparatus configured to move the seating part; and
    a robot part having
        a base part attached to the seating part;
        a body capable of rotating around a vertical axis normal to an attaching surface through which the seating part is attached to the base part; and
        a plurality of arms connected to the body, the arms having a plurality of joints;
    wherein the seating part has a first surface facing a work that is operated on by the robot part and a second surface that is different from the first surface,
    wherein the arms are formed such that a positional relationship between the arms and the first surface is substantially identical to the positional relationship between the arms and the second surface according to the rotation of the body around the vertical axis,
    wherein the arms are configured to rotate around an orthogonal axis that extends orthogonally relative to the vertical axis, and the orthogonal axis is offset from the vertical axis by a specific offset amount,
    wherein the offset amount is no less than the shortest distance between the vertical axis and the first surface, and
    wherein the offset amount is no less than the shortest distance between the vertical axis and the second surface when the body is rotated such that the arms are disposed above the second surface.

2. The mobile robot according to claim 1, wherein the seating part is substantially a rectangular parallelepiped.

3. The mobile robot according to claim 1, wherein a connection port to electrically connect the mobile robot to an external device is formed on at least either the first surface or the second surface.

4. The mobile robot according to claim 1, wherein the robot part can be stored within the size of the seating part in a plane orthogonal to the vertical axis.

5. The mobile robot according to claim 1, further comprising:
    a plurality of operation parts, each of which is mounted on each of the plurality of arms, in order to operate the work placed on a fixed base; and
    a plurality of detecting parts, each of which is mounted on each of the plurality of arms, in order to detect the positions of a plurality of benchmark indexes, each of which is arranged on the fixed base.

6. The mobile robot according to claim 5,
    wherein each of the plurality of detecting parts detects a different benchmark index among the plurality of benchmark indexes, and
    the plurality of detecting parts detect all of the plurality of benchmark indexes.

7. The mobile robot according to claim 5, wherein the joints are not provided between the detecting part and the operation part.

8. A positioning system of the mobile robot, comprising:
the mobile robot according to claim 5; and
the plurality of benchmark indexes each of which is arranged on the fixed base.

9. A positioning method of robot, comprising:
starting a mobile robot comprising:
- a seating part;
- a moving apparatus configured to move the seating part; and
- a robot part having
    - a base part attached to the seating part;
    - a body capable of rotating around a vertical axis normal to an attaching surface through which the seating part is attached to the base part;
    - a plurality of arms connected to the body, the arms having a plurality of joints;
    - a plurality of operation parts, each of which is mounted on each of the plurality of arms, in order to operate the work placed on a fixed base; and
    - a plurality of detecting parts, each of which is mounted on each of the plurality of arms, in order to detect the positions of a plurality of benchmark indexes, each of which is arranged on the fixed base,
wherein the seating part has a first surface facing a work that is operated on by the robot part and a second surface that is different from the first surface,
wherein the arms are formed such that a positional relationship between the arms and the first surface is substantially identical to the positional relationship between the arms and the second surface according to the rotation of the body around the vertical axis,
wherein the arms are configured to rotate around an orthogonal axis that extends orthogonally relative to the vertical axis, and the orthogonal axis is offset from the vertical axis by a specific offset amount, and
wherein the offset amount is no less than the shortest distance between the vertical axis and the first surface,
detecting one benchmark index among the plurality of benchmark indexes by one detecting part among the plurality of detecting parts,
detecting an other benchmark index different from the one benchmark index by an other detecting part different from the one detecting part, and
detecting further benchmark index further different from neither the one benchmark index nor the other benchmark index by a detecting part different from the other detecting part.

10. The mobile robot according to claim 1, wherein the orthogonal axis extends through respective portions of each of the arms.

11. The mobile robot according to claim 1, wherein the first surface and the second surface are side surfaces of the seating part,
wherein the mobile robot is configured to operate the moving apparatus to move the seating part to a position where the first surface faces the work while the second surface faces a second work, and
wherein the arms operate the first work and subsequently operate the second work without moving the seating part.

12. The mobile robot according to claim 11, wherein the mobile robot is configured to rotate the body around the vertical axis between operating the first work and operating the second work.

* * * * *